(12) United States Patent
Zhu et al.

(10) Patent No.: US 7,762,720 B1
(45) Date of Patent: Jul. 27, 2010

(54) FABRICATION OF MINIATURE FIBER-OPTIC TEMPERATURE SENSORS

(75) Inventors: Yizheng Zhu, Durham, NC (US); Anbo Wang, Blacksburg, VA (US)

(73) Assignee: Virginia Tech Intellectual Properties, Inc., Blacksburg, VA (US)

( * ) Notice: Subject to any disclaimer, the term of this patent is extended or adjusted under 35 U.S.C. 154(b) by 345 days.

(21) Appl. No.: 11/835,835

(22) Filed: Aug. 8, 2007

Related U.S. Application Data

(60) Provisional application No. 60/836,127, filed on Aug. 8, 2006.

(51) Int. Cl.
*G01J 5/00* (2006.01)
*G01K 11/00* (2006.01)

(52) U.S. Cl. .................. 374/131; 374/121; 374/161

(58) Field of Classification Search .............. 374/131, 374/121, 161
See application file for complete search history.

(56) References Cited

U.S. PATENT DOCUMENTS

| | | | |
|---|---|---|---|
| 5,381,229 A * | 1/1995 | Murphy et al. | 356/477 |
| 6,866,429 B2 * | 3/2005 | Wang et al. | 385/96 |
| 6,921,216 B1 * | 7/2005 | Li et al. | 385/96 |
| 7,054,011 B2 * | 5/2006 | Zhu et al. | 356/480 |
| 2002/0009279 A1 * | 1/2002 | Maron et al. | 385/137 |
| 2003/0059179 A1 * | 3/2003 | Jiang et al. | 385/96 |
| 2006/0245468 A1 * | 11/2006 | Hartog | 374/161 |
| 2009/0226128 A1 * | 9/2009 | Donlagic et al. | 385/13 |

OTHER PUBLICATIONS

A. Barnes et al., "Sapphire fibers: optical attenuation and splicing techniques," vol. 34, No. 30, Applied Optics, Oct. 20, 1995, pp. 6855-6858.*
M.R. Jones and D.G. Barker, "*Use of Optical Fiber Thermometers in High Temperature Environment*," 11$^{th}$ IEEE International Conference on Advanced Thermal Processing of Semiconductors, 2003, pp. 89-100.
R.R. Dils, "*High-Temperature Optical Fiber Thermomenter*," J. Appl. Phys. 54, Mar. 1983, pp. 1198-1201.
L. Tong, Y. Shen, L. Ye, and Z. Ding, "*A Zirconia Single-Crystal Fiber-Optic Sensor for Contact Measurement of Temperatures above 2000° C*," Meas. Sci. Technol. 10, (1999), pp. 607-611.
J.L. Kenndey, and N. Djeu, "*Operation of Yb:YAG Fiber-Optic Temperature Sensor up to 1600°C*," Sensors Actuators A 100, (2002), pp. 187-191.
A. Wang, S. Gollapudi, K.A. Murphey, R.G. May, and R.O. Claus, "*Sapphire-Fiber-Based intrinsic Fabry-Perot Interferometer*," Opt. Lett, 17, (1992), pp. 1021-1223.

(Continued)

*Primary Examiner*—Gail Verbitsky
*Assistant Examiner*—Mirellys Jagan
(74) *Attorney, Agent, or Firm*—Blank Rome LLP (57) ABSTRACT

A method of coupling a silica fiber and a sapphire fiber includes providing a silica fiber having a doped core and a cladding layer, with the doped core having a prescribed diameter, providing a sapphire fiber having a diameter less than the doped core, placing an end of the sapphire fiber in close proximity to an end of the silica fiber, applying a heat source to the end of silica fiber and introducing the end of sapphire fiber into the heated doped core of the silica fiber to produce a coupling between the silica and sapphire fibers.

32 Claims, 8 Drawing Sheets

OTHER PUBLICATIONS

J. Tapping and M. L. Reilly, "Index of refraction of sapphire between 24 and 1060° C for wavelengths of 633 and 799 nm," J. Opt. Soc. Am. A 3, 610-616 (1986).

A. Wang, S. Gollapudi, R. G. May, K.A. Murphey, and R. O. Claus, "Advances in sapphire-fiber-based intrinsic interferometric sensors," Opt. Lett. 17, 1544-1546 (1992).

* cited by examiner

FIG. 4(a) BEFORE SPLICE

FIG. 4(b) AFTER SPLICE

FABRICATION OF MINIATURE FIBER-OPTIC TEMPERATURE SENSORS

CROSS-REFERENCE TO RELATED APPLICATIONS

This application claims the benefit of U.S. Provisional Patent Application No. 60/836,127, filed on Aug. 8, 2006. The full disclosure of this provisional application is incorporated herein by reference.

STATEMENT OF GOVERNMENT INTEREST

This invention was made with Government support under Grant No. DE-FC26-99FT40685 awarded by the Department of Energy. The Government has certain rights in the invention.

FIELD OF THE INVENTION

The present invention is directed to temperature sensors. More specifically, the present invention is further directed to the implementation of temperature sensors that that can be used in high-temperature environments.

DESCRIPTION OF RELATED ART

Temperature sensing is one of the key topics in fiber-optic sensor research. Numerous schemes have been proposed since the early 1980s for a variety of applications from biological monitoring to industrial sensing. For high temperatures well above 1000° C., single-crystal optical fibers have been widely adopted for sensor fabrication owing to their excellent mechanical and optical properties at these elevated temperatures. Most of the fiber-optic, high-temperature sensors can be categorized into three main techniques: thermal radiation, fluorescence lifetime and optical interference.

The simplest form of radiation-based sensors are fiber versions of optical pyrometers, often referred to as lightpipe radiation thermometers (LPRTs), devices used in the semiconductor industry for wafer temperature monitoring during rapid thermal processing (RTP) by collecting radiation from the target surface and transmitting it to the detector. See, for example, M. R. Jones, and D. G. Barker, "Use of optical fiber thermometers in high temperature environment," 11th IEEE international conference on advanced thermal processing of semiconductors, 2003, pp. 89-100. Temperature can then be inferred using the standard two-color approach.

Other than merely a light collecting and transmitting pipe, another type of radiation-based sensor generates its own radiation signal with a metal-coated sapphire fiber tip which forms a blackbody cavity. See, for example, R. R. Dils, "High-temperature optical fiber thermometer," J. Appl. Phys. 54, 1198-1201 (1983). Operation up to 2300° C. has been demonstrated using zirconia single-crystal fiber. See, for example, L. Tong, Y. Shen, L. Ye, and Z. Ding, "A zirconia single-crystal fiber-optic sensor for contact measurement of temperatures above 2000° C.," Meas. Sci. Technol. 10, 607-611 (1999).

In both types, the radiation emitted by the fiber lightpipe itself adds to the target radiation and thus constitutes an error source, leaving the measurement sensitive to environmental temperature changes around the lightpipe. Therefore, in situ calibration is usually required and brings inconvenience to its field application. In fluorescence-based sensors, the fiber is doped and the dopant is excited by laser pulses to generate fluorescence, whose decay rate is temperature-dependent and used as the measurand. Operating temperatures of 1600° C. have been achieved by a Yb-doped single crystal YAG optical fiber. See, for example, J. L. Kennedy, and N. Djeu, "Operation of Yb:YAG fiber-optic temperature sensor up to 1600° C.," Sensors Actuators A 100, 187-191 (2002). The temperature dependence of the decay rate usually exhibits a vastly changing profile, increasing slowly at low temperature and very quickly toward the high temperature end. That will leave the sensor with quite different sensitivities and performance at difference temperature ranges and therefore may limit its dynamic range.

As another widely employed technique, fiber-optic interferometric sensors are known for their large dynamic range, high resolution and high accuracy. Various principles have been proposed based on both intrinsic and extrinsic Fabry-Perot (FP) interfereometers. See, for example, A. Wang, S. Gollapudi, K. A. Murphey, R. C. May, and R. O. Claus, "Sapphire-fiber-based intrinsic Fabry-Perot interferometer," Opt. Lett. 17, 1021-1223 (1992). However, one major concern of these sensors in high-temperature measurements is the large modal volume of single-crystal sapphire fibers. The intermodal dispersion makes it difficult to generate good fringes which are sensitive to the quality and the parallelism of the interferometer surfaces.

To address that issue, an extrinsic Fabry-Perot interferometric (EFPI) sensor, using a sapphire wafer as the interferometer, has been developed. The high quality and parallelism of the wafer surfaces allow easy generation of good interference fringes even for highly-multimode sapphire fiber. As the measurand, the wafer's optical thickness is temperature-dependent, as both the refractive index and the physical thickness increase with temperature.

Even so, the coupling of elements raises issues addressed above, in that dispersion and proper alignment become greater concerns. There is also a need for simpler and smaller configurations and achieving compact and durable connections between the wafer and the fiber.

SUMMARY OF THE INVENTION

It is thus an object of the present invention to provide a coupling of elements that allows for proper dispersion and proper alignment. It is also an object to provide such a coupling that can be used in a temperature sensor. It is also an object to provide simpler and smaller configurations achieving compact and durable connections between the wafer and the fiber.

To achieve the above and other objects, the present invention is directed to a method of coupling a silica fiber and a sapphire fiber that includes providing a silica fiber having a doped core and a cladding layer, with the doped core having a prescribed diameter, providing a sapphire fiber having a diameter less than the doped core, placing an end of the sapphire fiber in close proximity to an end of the silica fiber, applying a heat source to the end of silica fiber and introducing the end of the sapphire fiber into the heated doped core of the silica fiber to produce a coupling between the silica and sapphire fibers.

The step of providing the silica may also include providing another optical fiber and coupling a short length of the silica fiber to the other optical fiber. The step of applying a heat source to the end of the silica fiber may include applying a splicing arc to the end of the silica fiber. The coupling between the silica and sapphire fibers may provide an insertion loss for light passing through the coupling of less than 1 dB. The method may also produce the coupling without the use of an adhesive interlayer.

The present invention is also directed to a fiber optic coupling between a silica fiber and a sapphire fiber that includes a silica fiber having a doped core and a cladding layer, with the doped core having a prescribed diameter and a sapphire fiber introduced into the doped core through heating of an end of the silica fiber. The diameter of the doped core may be at least 100 μm and a diameter of the sapphire fiber is at least 75 μm. The coupling may also include a short length of the silica fiber coupled to another optical fiber through an adhesive. The coupling between the silica and sapphire fibers provides an insertion loss for light passing through the coupling of less than 1 dB.

The present invention is also directed to a temperature sensor for use in high-temperature environments that includes a silica fiber having a doped core and a cladding layer, with the doped core having a prescribed diameter and being configured to be connected to a light source and a spectrometer, a sapphire fiber, having a first end introduced into the doped core through heating of an end of the silica fiber and a sapphire wafer coupled to a second end of the sapphire fiber through an adhesive.

The present invention is further directed to a method of forming a temperature sensor for use in high-temperature environments that includes providing a silica fiber having a doped core and a cladding layer, with the doped core having a prescribed diameter and being configured to be connected to a light source and a spectrometer through a second end, heating a first end of the silica fiber, introducing a first end of a sapphire fiber into the doped core of the first end of the silica fiber and coupling a sapphire wafer to a second end of the sapphire fiber through an adhesive.

BRIEF DESCRIPTION OF THE DRAWINGS

A preferred embodiment of the present invention will be set forth in detail with reference to the drawings, in which:

FIG. 4 is a drawing which illustrates the process of splicing an optical fiber with a sapphire fiber, with FIG. 4(a) illustrating the fibers before they are joined and FIG. 4(b) illustrating the fibers after they have been joined, according to at least one embodiment of the present invention;

FIG. 15 is a drawing which illustrates the creation of space around the sensing area to accommodate excess water, with FIG. 15(a) providing for the bore to be enlarged in a notched fashion and FIG. 15(b) providing for the bore to be enlarged in a conical fashion, according to at least one embodiment of the present invention.

DETAILED DESCRIPTION OF THE PREFERRED EMBODIMENT

A preferred embodiment of the present invention will be set forth in detail with reference to the drawings, in which like reference numerals refer to like elements or operational steps throughout.

The present invention is directed to the design and detailed fabrication process of fiber-optic temperature sensors. When properly fabricated, the sensors have been demonstrated to be well-suited for reliable temperature monitoring even in the harshest environments.

Figure 1:
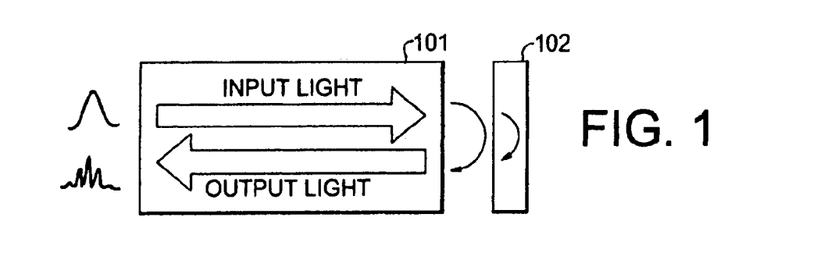
FIG. 1 is a schematic drawing illustrating the principles of a Fabry-Perot interferometer.

As illustrated in FIG. 1, the sensing mechanism is based on a wafer 102 whose surfaces create a Fabry-Perot interferometer. A fiber 101 can be used to deliver light to the wafer 102 and receive the reflected signal from which the wafer's optical thickness (OT, product of physical thickness, d, and refractive index n) can be obtained by white-light interferometry. Since both d and n have thermal dependences, OT can serve as an excellent indicator of environmental temperature. The sensor can be made of a variety of optical materials, e.g. fused silica, quartz, other types of glass, silicon, polymer, sapphire, zirconia, and many more.

Figure 2:
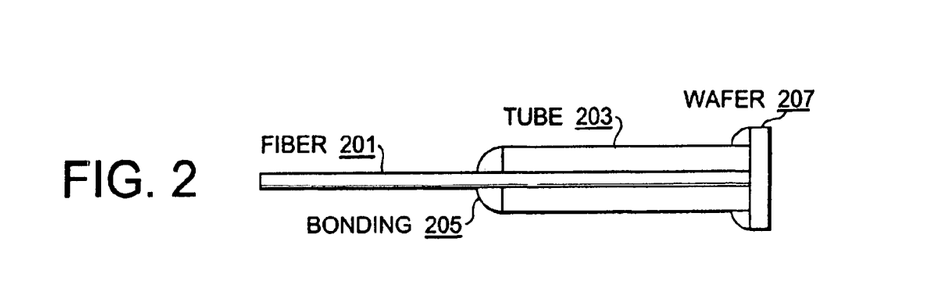
FIG. 2 is a drawing which illustrates a bonding connection between a fiber and a wafer, according to at least one embodiment of the present invention.

The connections between the fiber and the wafer can be made through various configurations. FIG. 2 illustrates one of these where both the wafer 207 and the fiber 201 are bonded to a supporting tube 203. That bonding can be achieved through a number of methods, e.g., adhesive bonding, direct bonding and fusion bonding.

Figure 3:
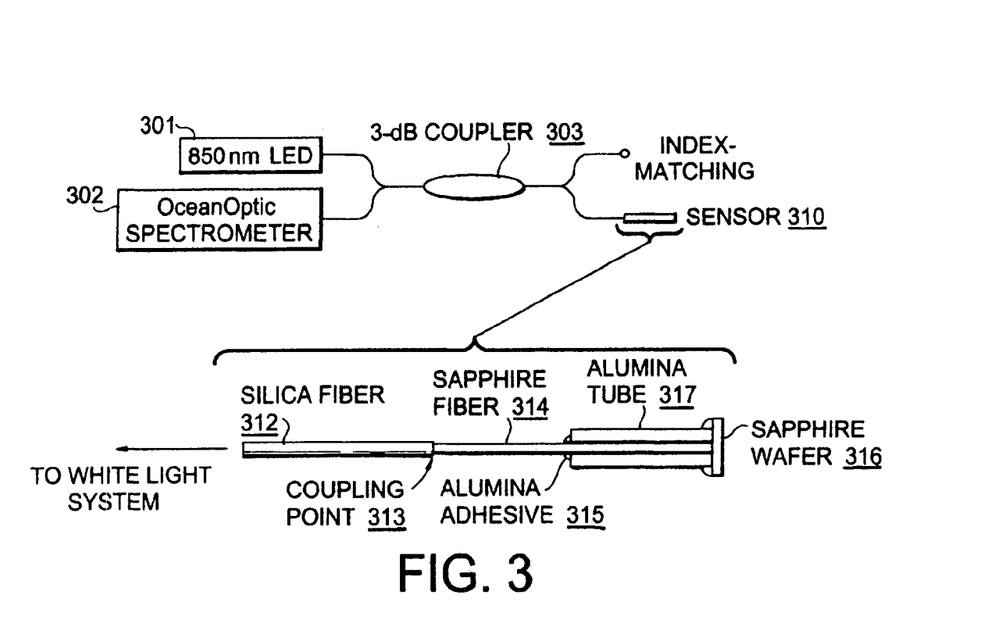
FIG. 3 is a schematic drawing which illustrates a system schematic for a sensor, according to at least one embodiment of the present invention.

FIG. 3 illustrates a schematic of the white-light interferometric system, according to one embodiment of the present invention. Broadband light from an 850 nm light-emitting diode (LED) 301 travels to the sensor through a 100/140 μm multimode (MM) fiber 3 dB-coupler 303. The reflected signal carries the wafer's interference spectrum to be detected by an OceanOptics USB2000 miniature spectrometer 302, in this embodiment. In the sensing arm, a 59 μm-thick C-plane sapphire wafer 316 of 1 mm×1 mm size is placed in front of a 15 cm-long 75 μm-thick sapphire fiber 314 (MicroMaterials Inc.) by a 99.8% alumina tube 317 (OD: 0.71 mm) and high-temperature adhesive 315. The sapphire fiber 314 also has the C-axis along its length. The other end of the sapphire fiber is spliced 313 to the 100/140 μm silica fiber312. Sub-millimeter size is achievable if the wafer is machine-diced. It should be noted that the specific equipment and sizes illustrate the use of the sensor in this embodiment, but other equivalent equipment and sizes may be employed to achieve the same or similar sensor.

The present invention is also directed to a coupling method between sapphire fiber and silica fiber. Sapphire fiber has excellent optical, mechanical and thermal properties, and therefore is used in many applications for light transmission. However, sapphire fiber is expensive and hard to couple with conventional silica fibers. Many applications thus require that the sapphire fiber to be coupled with conventional silica fibers to not only extend the length of light transmission, but also make the many silica-fiber-based optical devices available to the system. This invention provides a very simple way to join sapphire and silica fibers without the use of any adhesive interlayer. The coupling is strong with low insertion loss.

Figure 4A:
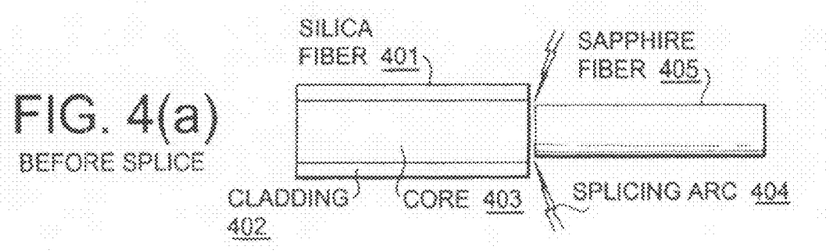
Figure 4B:
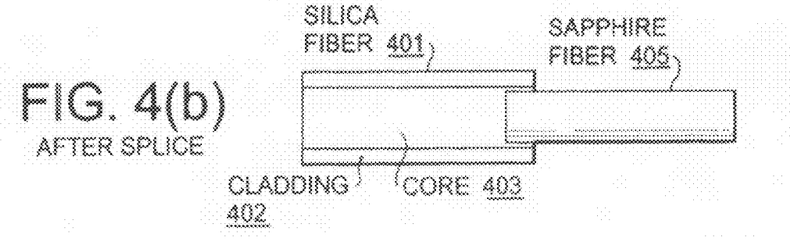

The coupling may be made through arc fusion splicing. FIG. 4 shows a schematic of the process. The silica fiber 401 has a doped core 403 and an undoped fused silica cladding 402. The sapphire fiber 405 has a diameter no larger than the core. The coupling is based on the fact that the doped core of the silica fiber softens at a much lower temperature than the undoped cladding. As shown in FIG. 4(a), under properly controlled (usually reduced) arc duration and power 404, the core will be softened while the cladding, as well as the sapphire fiber, will remain almost intact. Prior to the arc, the sapphire fiber is brought to the close proximity of the silica fiber. It is then heated by the arc and expands, protruding into the melted core of the silica fiber to make the connection, as illustrated in FIG. 4(b). Multiple arcs may be necessary, depending on the power and duration.

Figure 5:
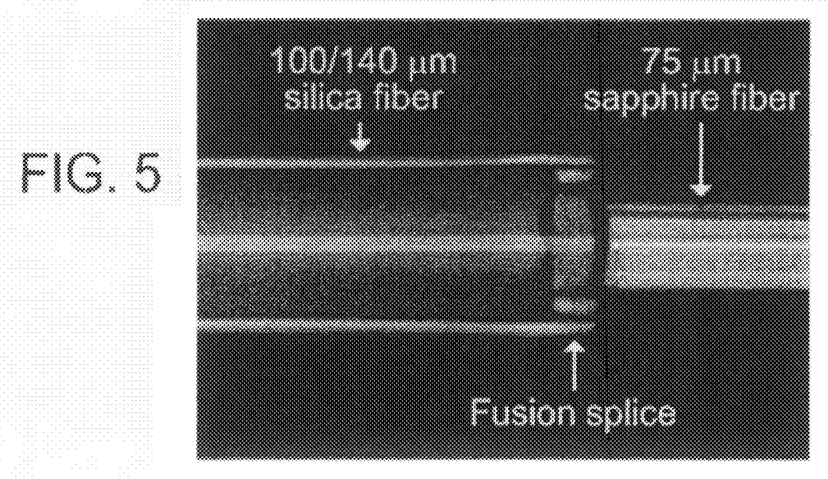
FIG. 5 is a photograph illustrating the splicing together of a silica fiber with a sapphire fiber, according to at least one embodiment of the present invention.
Figure 6:
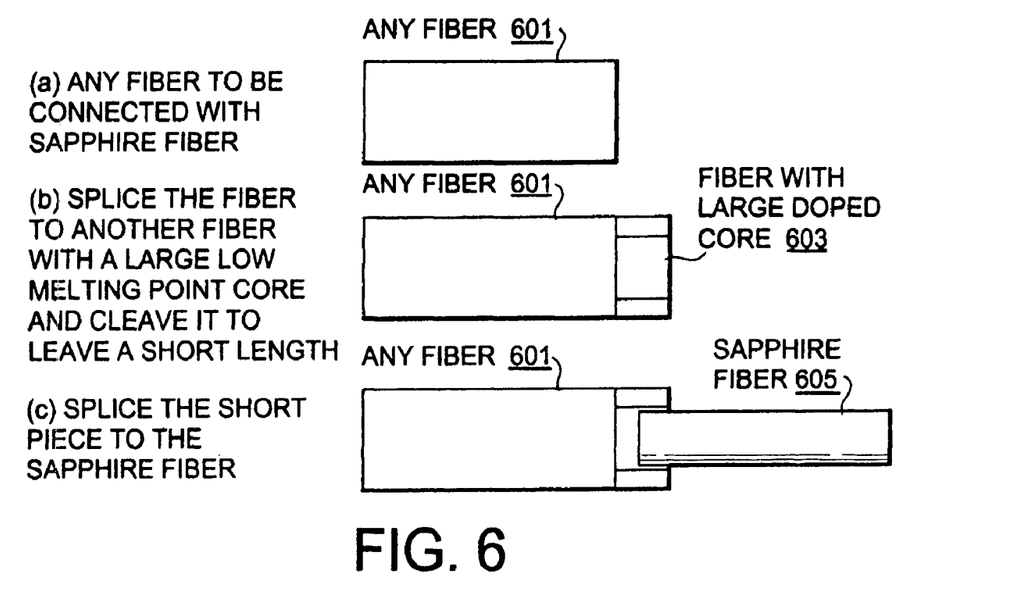
FIG. 6 is a drawing which illustrates an alternate process of splicing an optical fiber with a sapphire fiber, with FIG. 6(a) illustrating the fiber, FIG. 6(b) illustrating the attachment of a doped fiber section and FIG. 6(c) illustrating the splicing of the sapphire fiber with the co-joined optical fibers, according to at least one embodiment of the present invention.

FIG. 5 shows a photo of such a coupling between a core-doped 100/140 μm silica fiber and a 75 μm sapphire fiber with an insertion loss as a low 0.8 dB. This method is suitable for joining all types of silica fibers with sapphire fiber. For those fibers whose structure meets the requirements (low melting point core, core size no less than sapphire fiber diameter), they can be directly spliced to the sapphire fiber. For those fibers that do not meet the requirements, they can be first spliced to a very short piece of large doped core fiber (by splicing and cleaving) which can then be spliced to the sapphire fiber, as shown in FIG. 6. The original fiber 601, FIG. 6(a), is spliced and can be fused with another fiber with a large, low melting point core, as illustrated in FIG. 6(b). Thereafter, the sapphire fiber is introduced, as illustrated in FIG. 6(c), and the coupling occurs as discussed above.

The total light intensity received at the spectrometer can be written as $$I_{total}(\lambda) = I_B(\lambda) + I_D(\lambda) + I_{LED}(\lambda)(r_{couple} + r_{end}) + \\ I_{LED}(\lambda)\left[r_{s1} + r_{s2} - 2V\sqrt{r_{s1}r_{s2}}\cos\frac{4n(T)d(T)\pi}{\lambda}\right] \quad (1)$$

where $I_B(\lambda)$, $I_D(\lambda)$ and $I_{LED}(\lambda)$ are the light intensity of the blackbody radiation, the dark current of the spectrometer and the LED, respectively, $r_{couple}$, $r_{end}$, $r_{s1}$ and $r_{s2}$ are reflectance at every surfaces along the light path: the silica/sapphire fiber coupling point, the end face of the sapphire fiber, the first and second surfaces of the sapphire wafer, respectively, n is the refractive index of sapphire, d is the thickness of the wafer, V is the fringe visibility, λ is the wavelength and T is the temperature.

Figure 7:
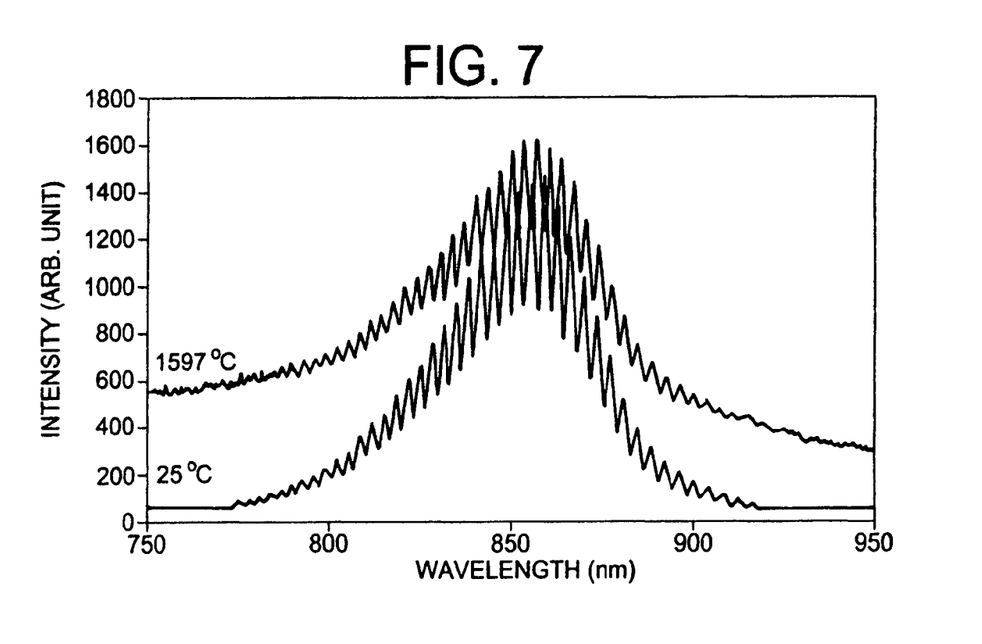
FIG. 7 illustrates a graph of the sensor spectrum of intensity versus wavelength, according to at least one embodiment of the present invention.

FIG. 7 shows typical sensor spectra at room temperature and 1597° C. The background intensity is significantly raised at 1597° C. by the blackbody radiation collected by the sapphire fiber.

Signal processing is based on the fact that all terms in Eq. (1) except the cosine are low-frequency components and therefore in Fourier transform the high-frequency cosine term can be filtered out by a band-pass filter, giving $$2V\sqrt{r_1r_2}\,I_{LED}(\lambda)\cos\frac{4n(T)d(T)\pi}{\lambda}.$$

This term can be further normalized by a Hilbert transform to result in $$\cos\frac{4n(T)d(T)\pi}{\lambda},$$

from which, the wafer's optical thickness, n(T)d(T), can be determined by the positions of interference valleys and/or peaks.

It is clear in FIG. 7 that the wafer fringes are added on top of a large background raised by several sources. During the fabrication, it is important to have sufficient fringe amplitude for a good signal-to-noise ratio.

The coupling of the silica and sapphire fibers was made through arc fusion splicing. That is different from previously reported splices using aluminosilicate glass as interlayer, such as reported in A. Wang, S. Gollapudi, R. G. May, K. A. Murphey, and R. O. Claus, "Advances in sapphire-fiber-based intrinsic interferometric sensors," Opt. Lett. 17, 1544-1546 (1992), and it is adhesive-free based on the fact that the 100 μm Ge-doped core of the silica fiber softens at a much lower temperature than the undoped cladding. Under properly reduced arc duration and power, the core will be softened while the cladding, as well as the sapphire fiber, will remain almost intact, as discussed above.

Figure 8:
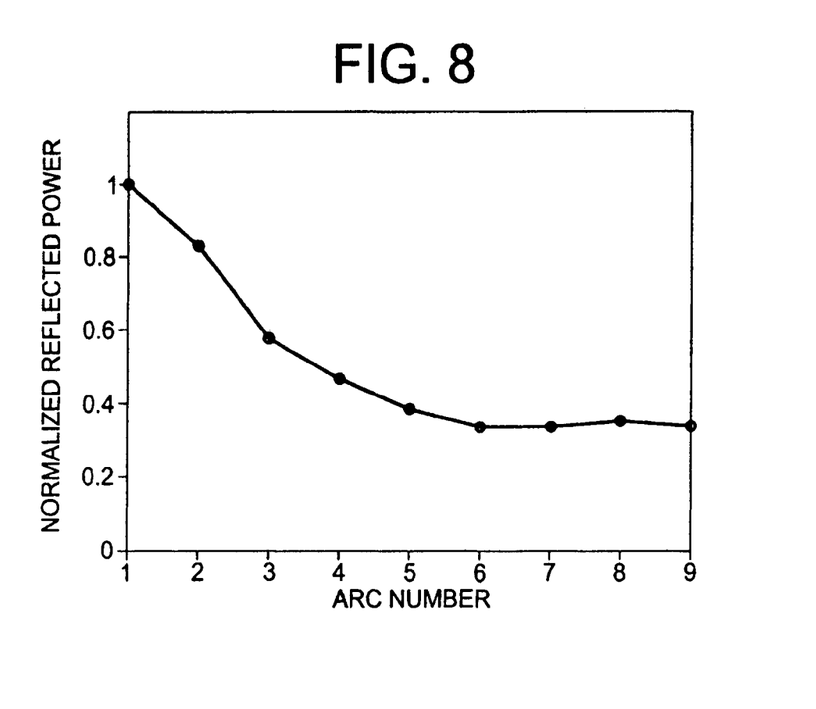
FIG. 8 presents a graph of reflected power versus arc number, according to at least one embodiment of the present invention.

FIG. 8 presents plots of the reflected power variation against the number of arcs. That power consists of both the reflection from the coupling point, $r_{couple}$ and the reflected signal from the sapphire fiber end, $r_{signal}$. The power tends to first decrease and then stabilize with the number of arcs. In FIG. 8, a total of 5 dB loss was recorded from the first arc to the last. However, much of that loss is attributed to the decrease of $r_{couple}$, because of the incomplete contact at the silica-sapphire interface which may leave small high-reflecting air voids during the first several arcs, as a result of low arc power and duration. As more arcs are applied, the two fibers come to full physical contact to eliminate the high-reflecting voids and the optical power is reduced. Since $r_{couple}$ can be removed in signal processing, its value is not critical to the application. The loss of $r_{signal}$ is however of more importance because it will determine the signal intensity. $r_{signal}$ is measured by immersing the sapphire fiber end from air into an index matching oil (n=1.522) and recording the intensity change which is proportional to $r_{signal}$. By comparing $r_{signal}$ before and after the splice, power loss as low as 0.8 dB has been measured, possibly due to the deformation of the 100/140 µm fiber which may scatter the light out of the coupling point. This method avoids any adhesive, producing a simple and robust joint. It is also successful in splicing 100-µm diameter sapphire fibers but fails for larger ones due to the apparent silica fiber core size limitation.

Figure 9:
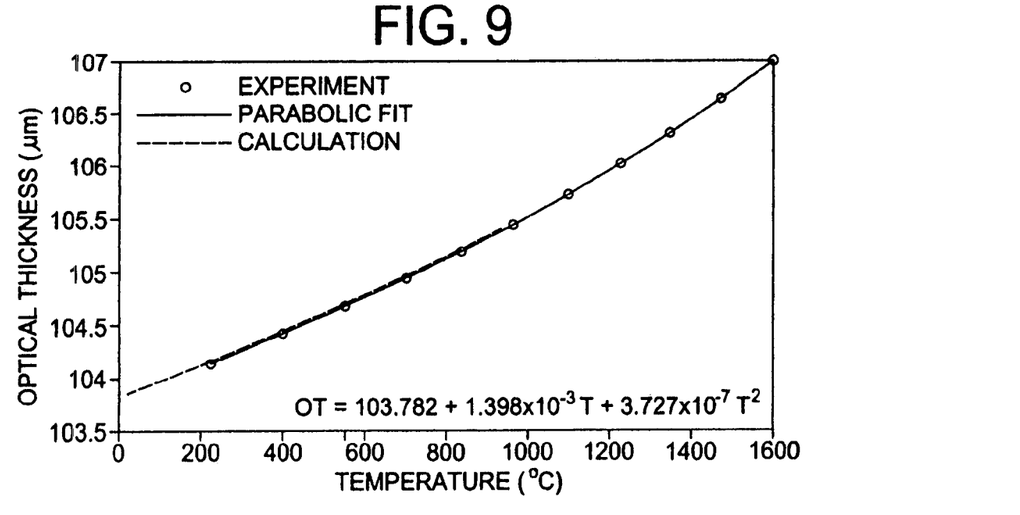
FIG. 9 presents a graph of the change in optical thickness as a function of temperature, according to at least one embodiment of the present invention.
Figure 10:
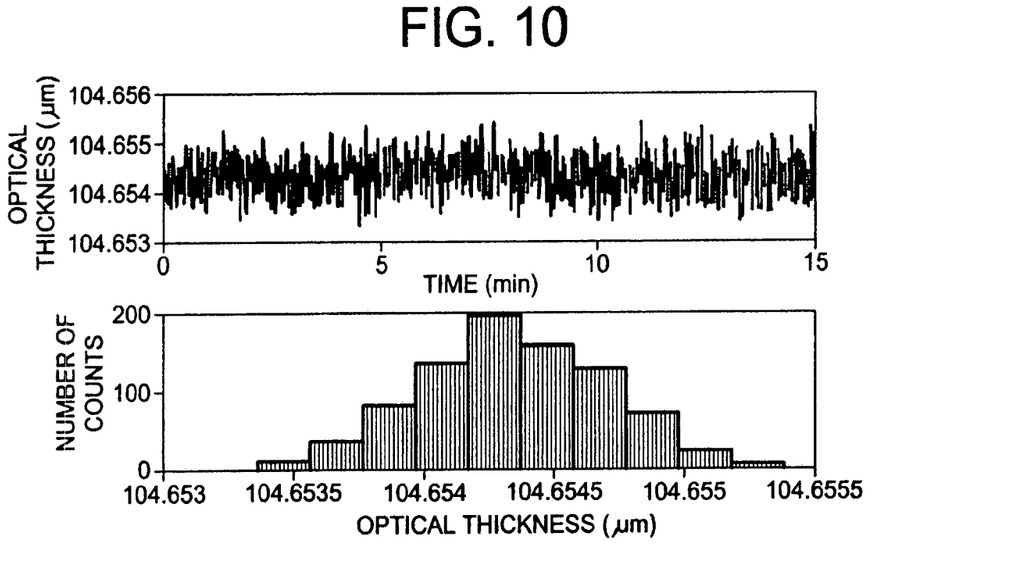
FIG. 10 presents graphs showing the sensor resolution at room temperature, according to at least one embodiment of the present invention.
Figure 11:
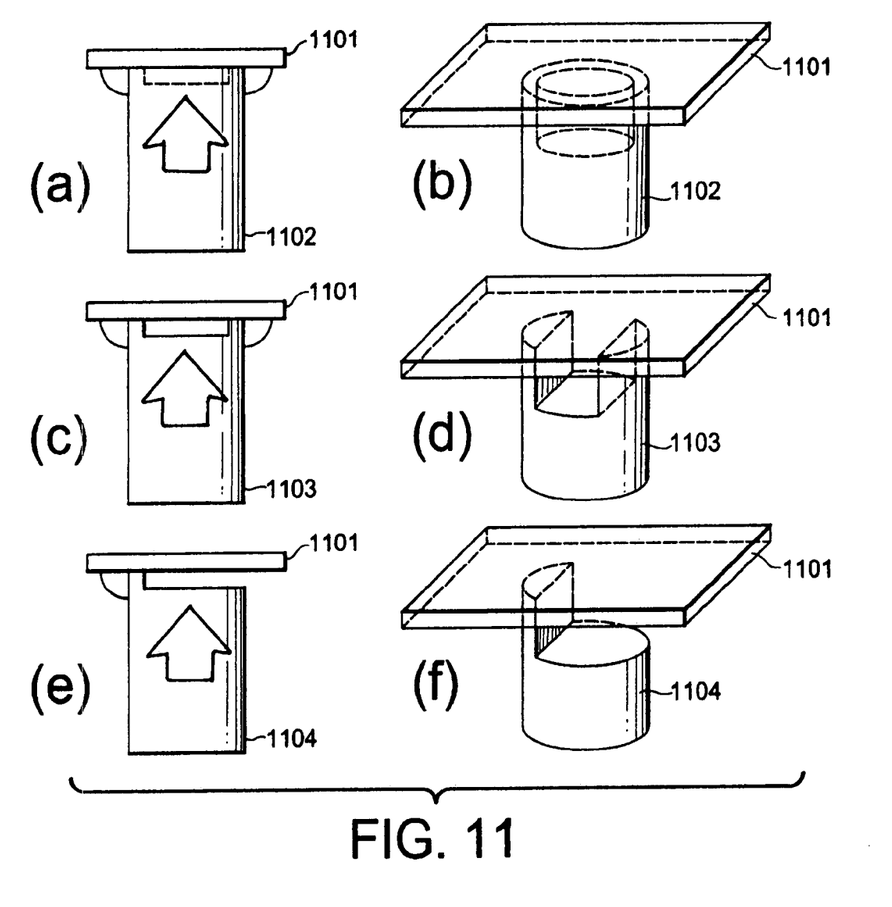
FIG. 11 is a drawing which illustrates embodiments of bonding between the fiber and the wafer, with FIGS. 11(a), (c) and (e) presenting the embodiments in cross-section and FIGS. 11(b), (d) and (f) presenting the embodiments in plan view; according to at least one embodiment of the present invention.

The sensor's temperature response was tested in a furnace (DelTech, Inc.) from 230° C. to 1600° C. A B-type thermocouple is used for temperature reference. FIG. 9 plots the change of optical thickness (open circles) with respect to temperature measured by the S-type thermocouple. The data is fitted by a parabola as the following:

$$OT = n(T)d(T) \quad (2)$$
$$= 103.782 + 1.398 \times 10^{-3}T + 3.727 \times 10^{-7}T^2 (\mu m)$$

and shown in FIG. 11 (solid curve). Also plotted is the calculated temperature response (dotted line) from published data of sapphire's thermal expansion and its refractive index. The recommended values of C-axis thermal expansion of sapphire can be written as:

$$d(T) = (1 - 0.192 + 5.927 \times 10^{-4}T + 2.142 \times 10^{-7}T^2 - 2.207 \times 10^{-11}T^3)d_0 \quad (3)$$

where T is the absolute temperature in Kelvin, d(T) is the thickness at T and $d_0$ is the initial thickness at 293 K (20° C.).

For the temperature dependence of the refractive index of the ordinary ray in sapphire, n(T), the authors of J. Tapping and M. L. Reilly, "Index of refraction of sapphire between 24 and 1060° C. for wavelengths of 633 and 799 nm," J. Opt. Soc. Am. A 3, 610-616 (1986), have measured this value from 24° C. to 1060° C. for wavelengths of 633 nm and 799 nm, as given by:

$$n(T)_{633nm} = 1.76565 + 1.258 \times 10^{-5}T + 4.06 \times 10^{-9}T^2 \quad (4)$$

and $$n(T)_{799nm} = 1.75991 + 1.229 \times 10^{-5}T + 3.10 \times 10^{-9}T^2 \quad (5)$$

where T is temperature in degree Celsius. By linear extrapolation from these two equations, a good estimation of n(T) for 850 nm can be obtained as the following:

$$n(T)_{850nm} = 1.75815 + 1.220 \times 10^{-5}T + 2.81 \times 10^{-9}T^2 \quad (6)$$

Based on Eqs. (3) and (6), a theoretical prediction of the optical thickness is given as the dotted line in FIG. 9. The calculation shows a reasonable match to the experimental data.

Eq. (2) indicates that the optical thickness increases with temperature in the form of a convex function. Therefore the sensitivity of the sensor, defined as the slope of the temperature response curve, increases with temperature as well. From Eq. (2) the sensitivity S can be obtained as:

$$S = \frac{d}{dT}[n(T)d(T)] \quad (7)$$
$$= 1.398 \times 10^{-3} + 7.454 \times 10^{-7} T (\mu m/°C.)$$

Therefore, S increases with temperature from 1.42 nm/° C. at 24° C. to 2.59 nm/° C. at 1600° C. Unlike the fluorescence-type sensor whose sensitivities can vary by orders of magnitude over a large temperature range, the sensitivities of this sensor remain at a similar level. Hence, one can expect similar performance throughout the entire temperature range.

Figure 12:
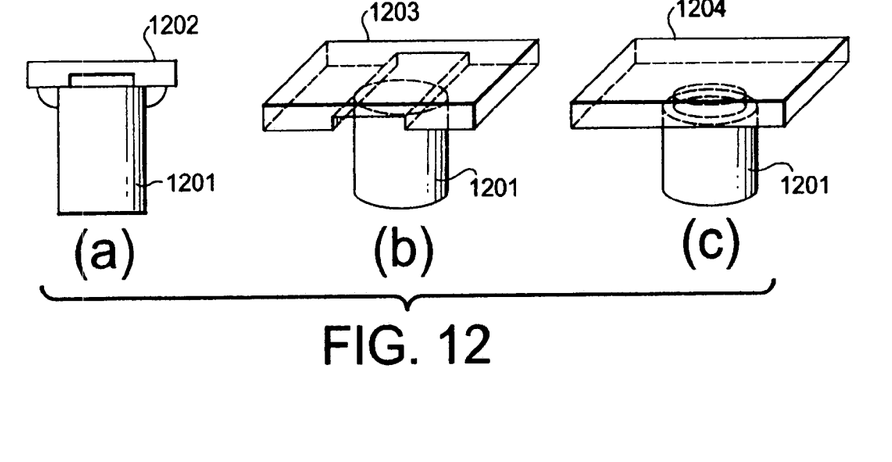
FIG. 12 is a drawing which illustrates alternative embodiments of bonding between the fiber and the wafer, with FIG. 12(a) presenting the embodiments in cross-section and FIGS. 12(b) and (c) presenting the embodiments in plan view; according to at least one embodiment of the present invention.

The resolution of the sensor is the smallest temperature change the sensor could resolve. Even under the same temperature, the sensor output (optical thickness) would statistically fluctuate due to system noises. A temperature change is discernible only when it is larger than this fluctuation, to determine which, the sensor's optical thickness was recorded for 15 minutes at room temperature (24° C.). FIG. 12 shows the result and the statistical distribution. It is then determined that the standard deviation δ of these data is about 0.3 nm. Therefore the resolution of the sensor at room temperature is:

$$R_{RT} = \frac{2\delta}{S_{RT}} = \frac{2 \times 0.3 nm}{1.42 nm/°C.} = 0.4° C. \quad (8)$$

where 2δ is taken as the smallest discernible temperature change. Better resolution can be achieved by taking a spectrum average. Since S remains at a similar level throughout the temperature range, R will remain at a similar level as well. That means the sensor has more uniform performance over the entire temperature range and thus a larger dynamic range, as compared to fluorescence-based sensors.

Figure 13:
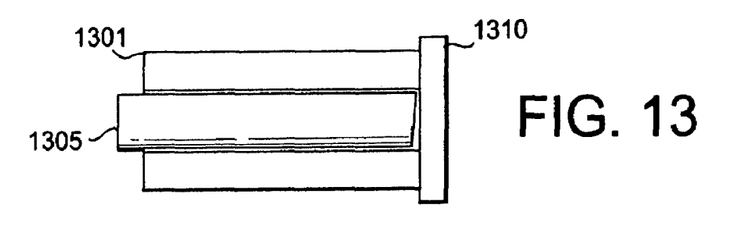
FIG. 13 is a drawing which illustrates the need for angle-polishing of the fiber end, according to at least one embodiment of the present invention.

Other configurations eliminate the supporting tube and bond the wafer directly on the fiber, making possible ultraminiature sensors having a size of only a few hundred microns. FIG. 13 illustrates some such structures, with FIGS. 13(a), (c) and (e) illustrating side views and FIGS. 13(b), (d) and (f) illustrating plan views of the embodiments. Each has a partially recessed fiber end-face, with the recessed part for sensing and the non-recessed port for supporting and bonding. FIGS. 13(a) and (b) illustrate a fiber having a centered, cylindrical recess, FIGS. 13(c) and (d) illustrate the recess being a notch in the fiber end and having two portions supporting the wafer and FIGS. 13(e) and (f) illustrate a similar notch that is non-symmetric.

Figure 14:
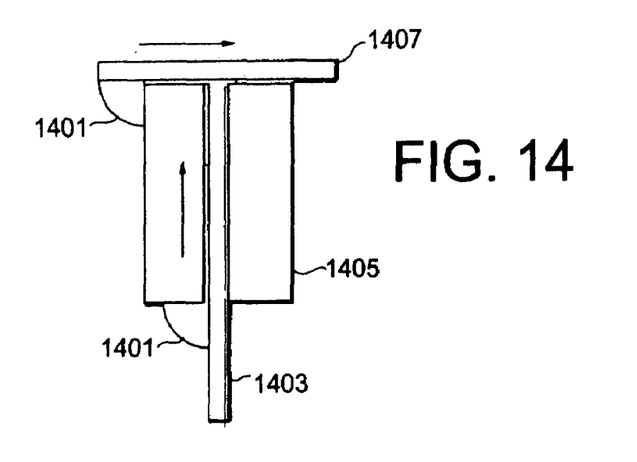
FIG. 14 is a drawing which illustrates the leakage of water into the sensor, according to at least one embodiment of the present invention.

It is also possible to have the recess in the wafer, instead of the fiber, as illustrated in FIG. 14. FIG. 14(a) illustrates a cross-section of such an embodiment, FIG. 14(b) illustrates a groove etched on the wafer and FIG. 14(c) illustrates a pit etched on the wafer.

With respect to fabrication, many of the discussed embodiments use sapphire fibers and wafers, but the fabrication processes can be used with other materials with little or no modification. For effective light transmission, the sapphire fiber end-face needs to be well polished. If such a high-quality surface is parallel to the wafer, it can form a Fabry-Perot interferometer with the first surface of the wafer. This second interferometer, in addition to the one formed by the wafer, will distort sensor signals and cause errors.

Figure 15A:
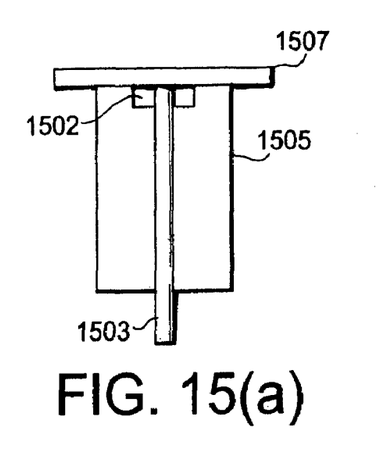
Figure 15B:
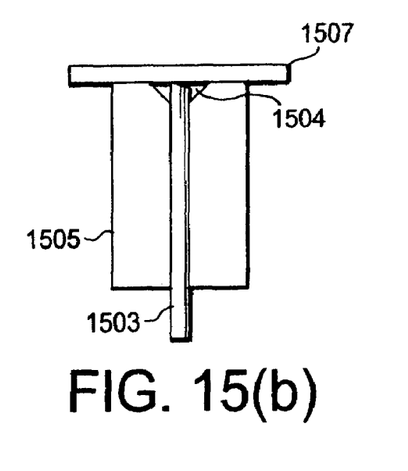

To avoid such errors, the fiber needs to be angle-polished to suppress this extra interface, as illustrated in FIG. 15. For 75 µm-thick sapphire fiber, experiments show that an angle of 1° is adequate to eliminate the distortion. Larger angles will reduce the coupling efficiency of reflected light and the signal amplitude. The angle requires that the fiber and the tube cannot be bonded and polished together before putting the wafer on. Otherwise, all surfaces would be parallel. Hence, the tube should be bonded first to the wafer and them to the fiber, in most embodiments.

Figure 16:
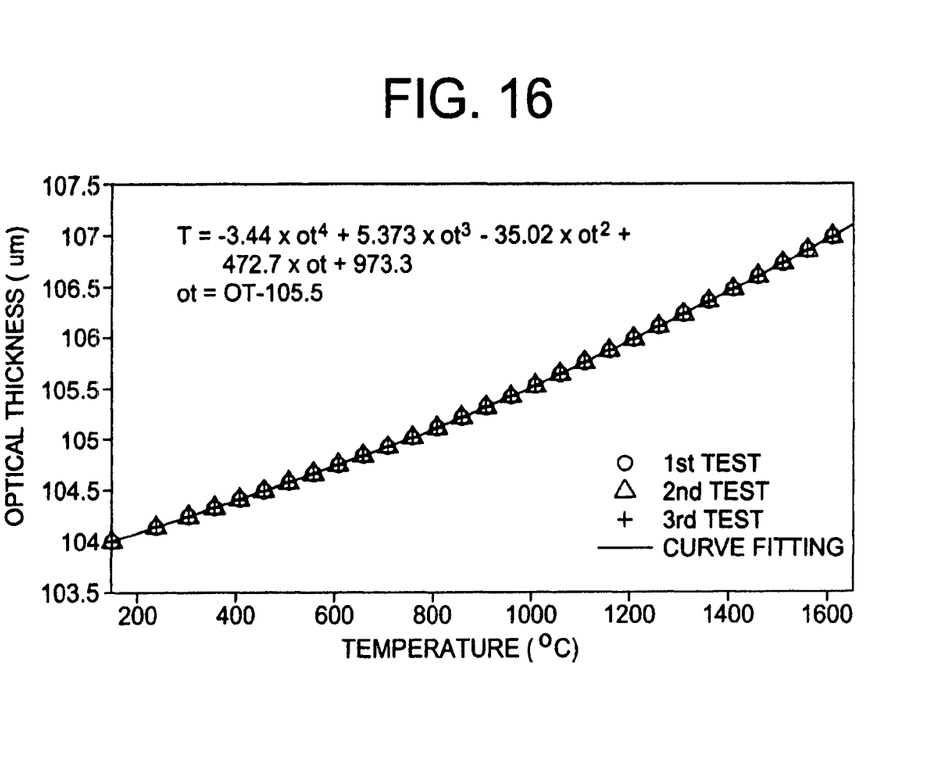
FIG. 16 presents a graph illustrating the change in the optical thickness with respect to temperature, according to at least one embodiment of the present invention.

In the application of adhesives, most adhesives are liquid or liquid-containing. The liquid may cause contamination if not handled properly. One example involves the use of a high-temperature adhesive for a sapphire-fiber sensor that is pastelike with a prescribed water content. Water can seep in between the wafer and the tube. Even though both are well polished, there may be a micro-sized or smaller gap therebetween. If too much adhesive 1601 was applied at the same time, water would carry contaminants all the way to the sensing area 1607 at the center and could flow into the bore, as illustrated in FIG. 16. Even after the water is dried out, the contaminants will remain on the optical surfaces. This may also occur when applying adhesive to bond the fiber and the tube.

To avoid contamination, the water content can be reduced by avoiding the use of excessive adhesive. Thus, only a small amount need be applied at a time over multiple applications, allowing time for the water to evaporate and the adhesive to dry before each application. Given the millimeter scale of the tube and the wafer, millimeter-sized adhesive is considered to be a large amount. A regular, bare silica fiber may be used to pick up and apply such a small amount of adhesive. Also, a microscope may be used for precise operation, which can be used manually or with translation stages. Another solution is to enlarge the bore to create more space around the sensing area to accommodate excess water, as shown in FIG. 17. In the two illustrated embodiments, the fiber 1703 makes contact with the wafer 1707 through a tube 1705. FIG. 17(*a*) provides for the bore 1702 to be enlarged in a notched fashion and FIG. 17(*b*) provides for the bore 1704 to be enlarged in a conical fashion.

In temperature tests, the furnace was run from 230° C. to 1600° C. at 3° C./min three times. The change in the optical thickness with respect to temperature by the B-type thermocouple is plotted in FIG. 18, demonstrating the full scale accuracy of ±0.2%. The temperature resolution is 0.4° C.

Besides its excellent performance, the present invention can also be easily calibrated and is suitable for batch fabrication. All wafers, regardless of their thicknesses, will have the same normalized temperature response as long as their materials are the same. Thus, one curve may be used for all similar sensors and there is no need to calibrate each individual sensor. Only an initial thickness is necessary for each sensor, its calibration curve can be readily obtained as the product of this initial thickness and the universal normalization curve.

This can be understood through the following equation:

$$OT = n(T)d(T) \quad (9)$$
$$= n_0 F(T) d_0 G(T)$$
$$= n_0 d_0 F(T) G(T)$$
$$= OT_0 F(T) G(T)$$

where OT is the optical thickness, n is the refractive index, d is the wafer thickness, T is temperature, $n_0$ and $d_0$ are n and d at a certain temperature. G(T) is a function of temperature only and determines the thermal expansion of the material. Similarly, F(T) controls the thermal changes of refractive index. Therefore, when normalized to $OT_0$, this becomes:

$$\frac{OPD}{OPD_0} = F(T)G(T) \quad (10)$$

Thus, a sapphire-fiber-based extrinsic Fabry-Perot interferometric sensor has been demonstrated for high temperature measurement. The adhesive-free coupling of the silica and sapphire fibers is made possible through fusion splicing by the low-melting point of the doped silica fiber core and a loss as low as 0.8 dB has been measured. Also studied is the dependence of the sensor signal on the alignment angle, showing that a relatively large angle range can be tolerated for high fringe intensity. The prototype sensor was tested from 230° C. to about 1600° C. with a resolution of 0.4° C. and the sensor response is in good agreement with the theoretical prediction.

Additionally, while the present invention has been discussed with respect to sapphire fibers and wafers, the present invention is not so limited. For example, the silica-sapphire fiber coupling and sensor head may be made from other types of "single-crystal" fibers and wafers. Possible examples include lithium niobate, silver bromide, barium metaborate, etc. The coupling may be accomplished as long as the inserted fiber has a smaller diameter that the core of the fiber into which it is inserted.

While a preferred embodiment has been set forth in detail above, those skilled in the art will readily appreciate that other embodiments can be realized within the scope of the invention. For example, numerical values are illustrative rather than limiting, as is the order in which steps are carried out. Therefore, the present invention should be construed as limited only by the appended claims.

What is claimed is:

1. A method of coupling a silica fiber and a sapphire fiber, comprising the steps of:
   providing a silica fiber having a doped core and a cladding layer, with the doped core having a prescribed diameter;
   providing a sapphire fiber having a diameter less than the prescribed diameter of the doped core;
   placing an end of the sapphire fiber in close proximity to an end of the silica fiber;
   applying a heat source to the end of the silica fiber; and
   introducing the end of the sapphire fiber into the heated doped core of the silica fiber to produce a coupling between the silica fiber and sapphire fiber.

2. The method according to claim 1, wherein the diameter of the doped core is at least 100 μm and the diameter of the sapphire fiber is at least 75 μm.

3. The method according to claim 1, wherein the step of providing the silica fiber further comprises:
   providing another optical fiber; and
   coupling a short length of the silica fiber to the other optical fiber.

4. The method according to claim 1, wherein the step of applying a heat source to the end of the silica fiber comprises applying a splicing arc to the end of the silica fiber.

5. The method according to claim 1, wherein the coupling between the silica and sapphire fibers provides an insertion loss for light passing through the coupling of less than 1 dB.

6. The method according to claim 5, wherein the method produces coupling without the use of an adhesive interlayer.

7. A fiber optic coupling between a silica fiber and a sapphire fiber, comprising:
   a silica fiber having a doped core and a cladding layer, with the doped core having a prescribed diameter; and
   a sapphire fiber introduced into the doped core through heating of an end of the silica fiber.

8. The coupling according to claim 7, wherein the diameter of the doped core is at least 100 μm and a diameter of the sapphire fiber is at least 75 μm.

9. The coupling according to claim 7, further comprising a short length of the silica fiber coupled to another optical fiber.

10. The coupling according to claim 7, wherein the short length of the silica fiber is coupled to the another optical fiber through an adhesive.

11. The coupling according to claim 7, wherein the coupling between the silica and sapphire fibers provides an insertion loss for light passing through the coupling of less than 1 dB.

12. A temperature sensor for use in high-temperature environments, comprising:
 a silica fiber having a doped core and a cladding layer, with the doped core having a prescribed diameter and being configured to be connected to a light source and a spectrometer;
 a sapphire fiber, having a first end introduced into the doped core through heating of an end of the silica fiber; and
 a sapphire wafer coupled to a second end of the sapphire fiber through an adhesive.

13. The temperature sensor according to claim 12, wherein the second end of the sapphire fiber has a region removed from a center of the sapphire fiber.

14. The temperature sensor according to claim 13, wherein the second end of the sapphire fiber has a region removed from the sapphire fiber to form a notch in the second end of the sapphire fiber.

15. The temperature sensor according to claim 12, wherein the sapphire wafer has a region removed from a coupling surface of the sapphire wafer to facilitate the coupling of the sapphire wafer and fiber.

16. The temperature sensor according to claim 15, wherein the region removed from a coupling surface of the sapphire wafer is circular.

17. The temperature sensor according to claim 15, wherein the region removed from a coupling surface of the sapphire wafer forms a slot on the coupling surface of the sapphire wafer.

18. The temperature sensor according to claim 12, further comprising a tube surrounding the sapphire fiber at the second end of the sapphire fiber and adhesive which is applied between a second end of the tube and the sapphire wafer.

19. The temperature sensor according to claim 18, wherein further adhesive bonds the sapphire fiber to a first end of the tube.

20. The temperature sensor according to claim 18, wherein the second end of the sapphire fiber is polished to approximately a 1° angle with respect to a centerline of the sapphire fiber.

21. The temperature sensor according to claim 18, wherein the second end of the tube is recessed to accommodate excess water.

22. A method of forming a temperature sensor for use in high-temperature environments, comprising the steps of:
 providing a silica fiber having a doped core and a cladding layer, with the doped core having a prescribed diameter and being configured to be connected to a light source and a spectrometer through a second end;
 heating a first end of the silica fiber;
 introducing a first end of a sapphire fiber into the doped core of the first end of the silica fiber; and
 coupling a sapphire wafer to a second end of the sapphire fiber through an adhesive.

23. The method according to claim 22, wherein the step of coupling a sapphire wafer to a second end of the sapphire fiber through an adhesive comprises adding small amounts of adhesive to the sapphire wafer.

24. The method according to claim 22, further comprising:
 providing a tube over the sapphire fiber such that the tube surrounds the sapphire fiber at the second end of the sapphire fiber; and
 applying an adhesive between a second end of the tube and the sapphire wafer.

25. The method according to claim 24, further comprising applying adhesive bonds from the sapphire fiber to a first end of the tube.

26. The method according to claim 24, further comprising polishing the second end of the sapphire fiber to approximately a 1° angle with respect to a centerline of the sapphire fiber.

27. A method of coupling an optical fiber and a single-crystal fiber, comprising the steps of:
 providing an optical fiber having a core and a cladding layer, with the core having a prescribed diameter;
 providing a single-crystal fiber having a diameter less than the core;
 placing an end of the single-crystal in close proximity to an end of the optical fiber;
 applying a heat source to the end of the optical fiber; and
 introducing the end of the single-crystal fiber into the heated core of the optical fiber to produce a coupling between the optical and single-crystal fibers.

28. The method according to claim 27, wherein the diameter of the core is at least 100 µm and the diameter of the single-crystal fiber is at least 75 µm.

29. The method according to claim 27, wherein the step of providing the optical fiber further comprises:
 providing another optical fiber; and
 coupling a short length of the optical fiber to the other optical fiber.

30. The method according to claim 27, wherein the step of applying a heat source to the end of the optical fiber comprises applying a splicing arc to the end of the optical fiber.

31. The method according to claim 27, wherein the coupling between the optical fiber and the single-crystal fiber provides an insertion loss for light passing through the coupling of less than 1 dB.

32. The method according to claim 31, wherein the method produces coupling without the use of an adhesive interlayer.

* * * * *